May 13, 1941.  W. ERNST  2,241,545
VALVE
Original Filed Aug. 5, 1935   5 Sheets-Sheet 1

Inventor
WALTER ERNST,
BY
Toulmin & Toulmin
Attorneys

INVENTOR
WALTER ERNST.
BY
ATTORNEYS

INVENTOR
WALTER ERNST.

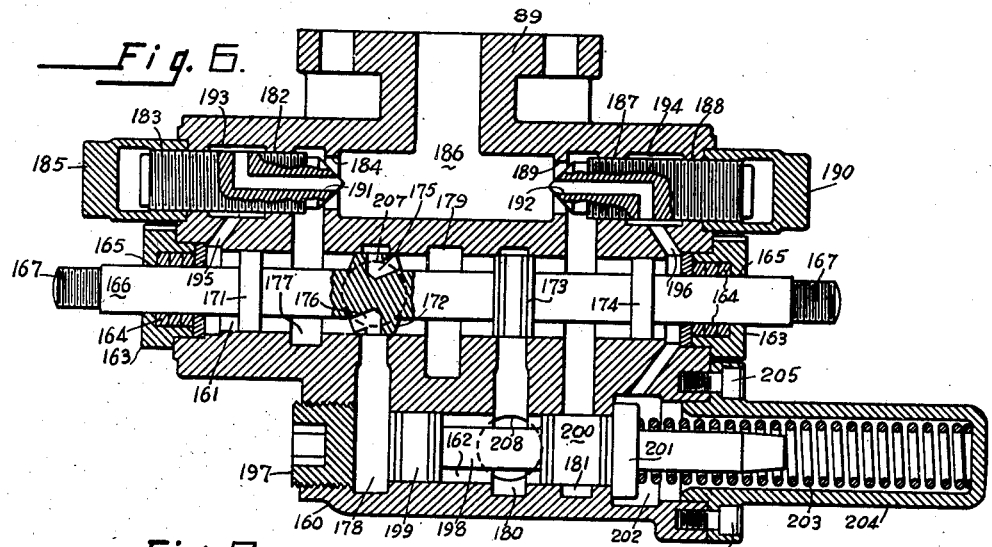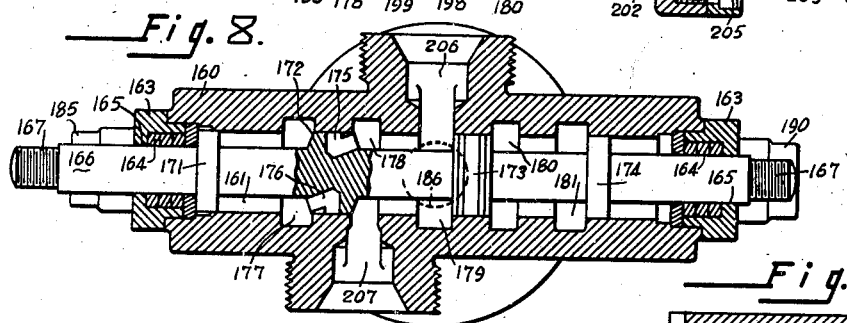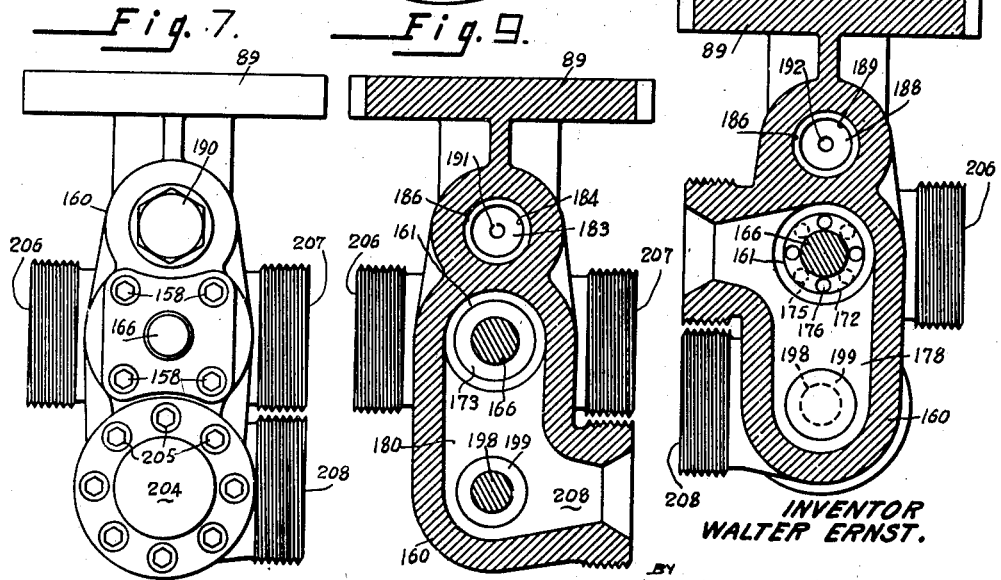

May 13, 1941.	W. ERNST	2,241,545
VALVE
Original Filed Aug. 5, 1935    5 Sheets-Sheet 5
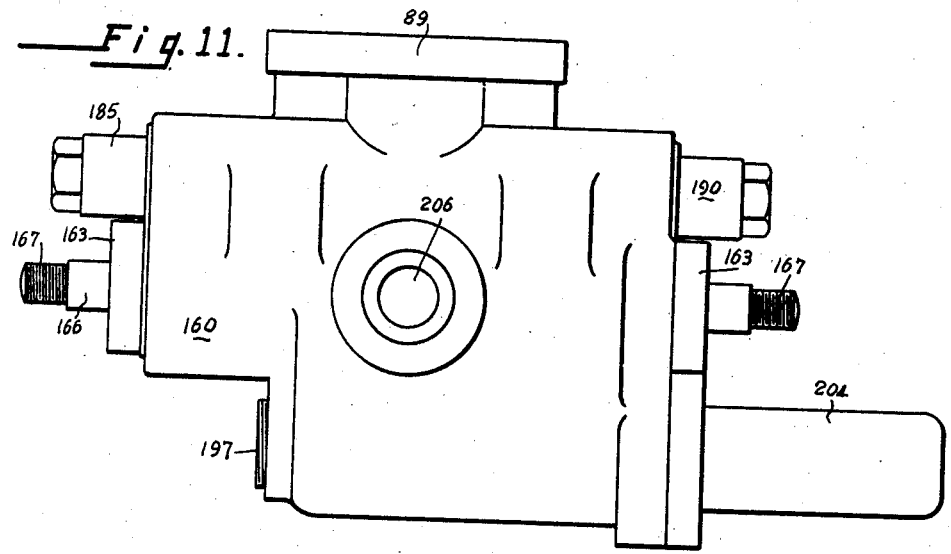
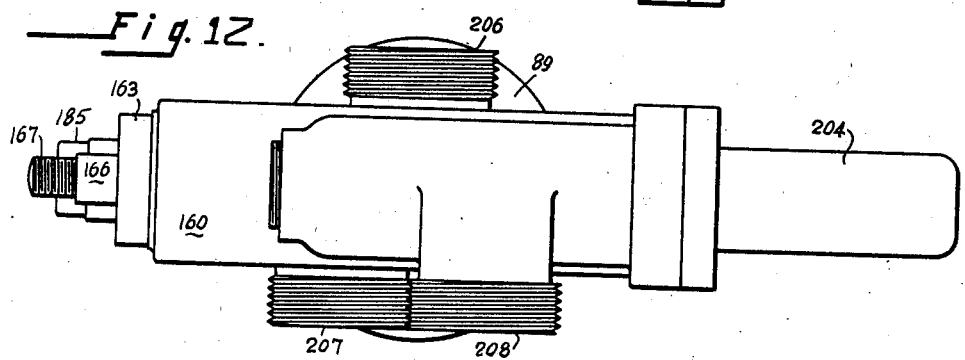
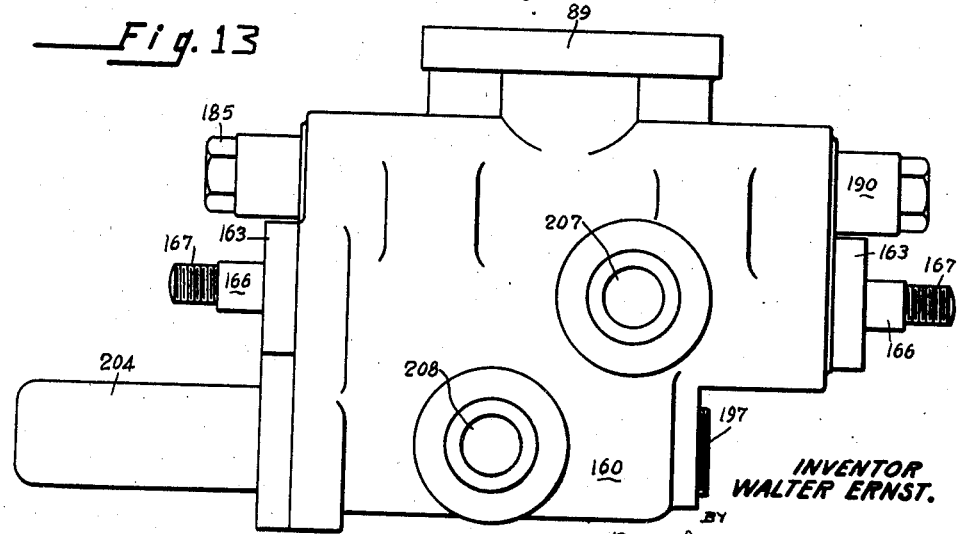
INVENTOR
WALTER ERNST.
BY
Toulmin & Toulmin
ATTORNEYS Patented May 13, 1941

2,241,545

UNITED STATES PATENT OFFICE 2,241,545

VALVE

Walter Ernst, Mount Gilead, Ohio, assignor to The Hydraulic Press Corp. Inc., Wilmington, Del., a corporation of Delaware Original application August 5, 1935, Serial No. 34,652, now Patent No. 2,190,939, dated February 20, 1940. Divided and this application January 15, 1938, Serial No. 185,183

8 Claims. (Cl. 121—46.5)

This invention relates to hydraulic machinery, and in particular, to valves for controlling hydraulic machinery, such as presses.

One object of this invention is to provide a valve for controlling hydraulic machinery, such as a press, this valve being arranged to by-pass the delivery of the pump automatically until pressure has been released from the main cylinder, after which the valve automatically shifts to apply the delivery of the pump to the platen returning cylinders, or to the return side of the double-acting main plunger.

Another object is to provide a four-way valve for controlling a hydraulic press, this valve having an automatic by-pass arrangement for automatically by-passing the delivery of the pump at the instant of reversal of the press so as to release the pressure from the main cylinder to a predetermined extent, and thereafter to automatically apply the delivery of pressure fluid from the pump to the platen returning devices, such as either to pull-back cylinders or to the return side of the main plunger, if a double-acting main plunger is employed.

This is a division of my copending application, Ser. No. 34,652, filed August 5, 1935, now Patent No. 2,190,939.

In the drawings:

Figure 6 is a view similar to Figure 2, but with the valve in its fifth position, i. e. while the press is idle at the top of its return stroke.

Figure 7 is an end elevation of the valve shown in Figures 2 to 6.

Figure 8 is a vertical section along the line 8—8 in Figure 2.

Figure 9 is a vertical section along the line 9—9 in Figure 2.

Figure 10 is a vertical section along the line 10—10 of Figure 5.

Figure 11 is a top plan view of the valve shown in Figures 2 to 10.

Figure 12 is a front elevation of the valve shown in Figure 11.

Figure 13 is a bottom plan view of the valve shown in Figure 11.

General arrangement

Figure 1:
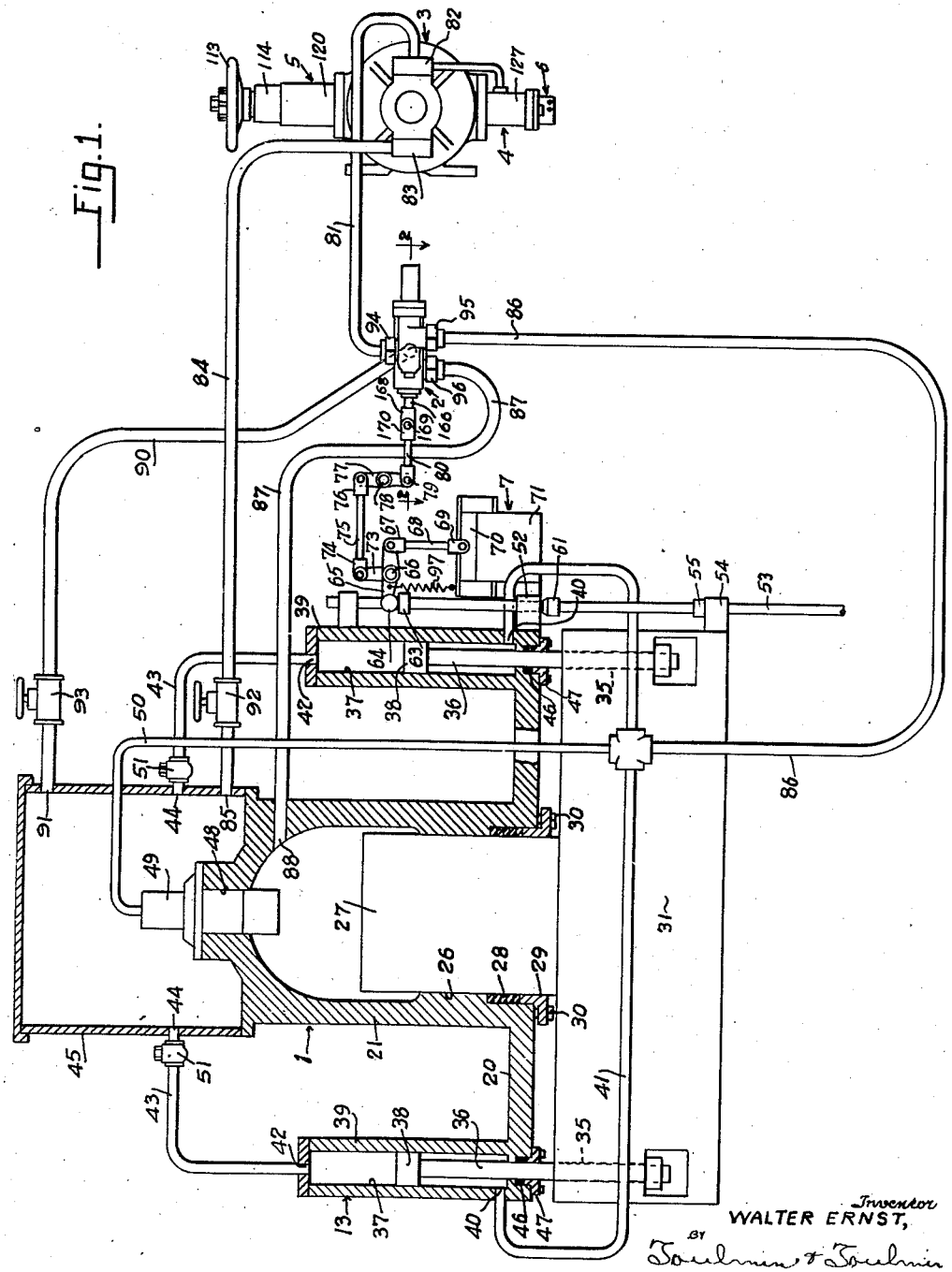
Figure 1 is a diagrammatic view, partly in section, showing the principal elements of a typical circuit with which the valve of the present invention is adapted to be used.

In general, the present invention is concerned with a valve adapted for use with a control system for operating hydraulic machines, such as a press, in which a pump is employed in connection with a multi-position valve, the valve itself being so shifted to apply the pressure fluid from the pump selectively to the main cylinder for a pressing stroke, to the pull-back cylinders for a return stroke, to by-pass the pump discharge while releasing the pressure from the main cylinder between the forward and return strokes, and to by-pass the pump discharge and cause the press to be held at the top of its return stroke.

Hitherto, when four-way valves have been employed with a pump discharging in one direction, it has been found difficult to control the release of the pressure from the large main cylinder during the operation of the valve. If the valve was opened quickly a recoil resulted, due to the sudden release of pressure from the main cylinder. On the other hand, if it was attempted to release the pressure slowly or release it through a restricted opening, then a time interval occurred during which there was no place for the discharge of the pump to go. The pump discharge was to be directed into the pull-back cylinders, but could not return the press until after the pressure had dropped from the main cylinder. If this pressure drop occupied too long a time, a shock was set up in the pump and discharged into the pull-back cylinders without causing the platen to move.

The present invention includes a valve having an additional valve stem which is automatically held open by the pressure in the main cylinder so long as there is any pressure in this main cylinder, this additional valve stem providing a by-pass for the pump until all pressure has been released from the main cylinder. In this manner there is provided a controlled release of pressure from the main cylinder at any desired speed, and yet the pump discharge is automatically bypassed while the release of pressure in the main cylinder takes place. After this main cylinder pressure is fully released, the by-pass automatically closes and permits the pump discharge to flow into the pull-back cylinders and return the press. In this way there is provided a smooth release of pressure, and a smooth pick-up on the pull-back stroke.

The valve in the present invention is actuated by electrical means controlled by a switch associated with the pump control mechanism, thereby eliminating the necessity for separate pressure switches, or similar devices. The electrical circuit containing these devices is arranged so that the press may be operated in three different ways: Completely automatic operation, wherein the press automatically performs an indeterminate number of pressing and return strokes without halting at the end of the return stroke; semi-automatic operation, wherein the press is caused to execute a pressing and return stroke, and then halt at the end of the return stroke; and manual operation, wherein the operation of the press is controlled manually so that the operator controls the point at which the press platen will stop at the end of the pressing stroke and/or the return stroke.

Typical circuit in which valve is used

Referring to the drawings in detail, Figure 1 shows a typical circuit in which the valve of the present invention may be used. In this circuit there is shown a press, generally designated 1, connected to the control valve of this invention, generally designated 2. The latter is hydraulically connected to and receives the discharge of a pump, generally designated 3. The pump 3 is provided with a pressure-responsive control device, generally designated 4, which by means of a hydraulic motor returns the flow-control element of the pump to a neutral position upon the attainment of a predetermined pressure, the amount of which may be regulated by the adjusting mechanism, generally designated 5. An electrical circuit breaking device, generally designated 6, is associated with the pressure-responsive device 4 and actuated thereby to control the energization of the electrical solenoidal motor, generally designated 7, employed for shifting the control valve 2 to its various positions. As hereinafter explained, the control valve 2 may be also shifted mechanically by devices associated with the press.

The press 1, shown diagrammatically in Figure 1, is provided with a top member 20 containing a main cylinder portion 21, having a main cylinder bore 26 containing a main plunger 27. The latter passes through a packing 28, compressed by a gland 29 by any suitable means, such as by the cap screws 30. This prevents leakage of fluid from the main cylinder bore 26 around the main plunger 27. To the lower end of the main plunger 27 is attached the platen 31, which is reciprocably mounted in any conventional manner. The details of the lower part of the press, such as the usual strain rods, bed plate, etc., have been omitted in order to simplify the showing.

The platen 31 in its central plane and at its outer extremities is provided with bores 35 within which are secured pull-back piston rods 36. The piston rods 36 have pull-back pistons 38 mounted on the upper ends thereof and arranged to reciprocate within the pull-back cylinder bores 37 of the pull-back cylinders 39 forming a part of the press top member 20 and mounted on either side of the main cylinder portion 21. The ports 40 beneath the pull-back pistons 38 open into the pipe line 41, which serves to convey fluid thereto from the control valve 2, in a manner described below. Similarly, the upper ends of the pull-back cylinders 39 contain ports 42, from which the pipe lines 43 run to the ports 44 of the surge tank 45 to drain off leakage escaping past the pistons 38. Escape of fluid from the pull-back cylinders 39 is prevented by packings 46, compressed by glands 47 arranged around the piston rods 36.

The head of the main cylinder 26 is provided with a bore 48 arranged to receive a surge valve 49, to which is attached the actuating pipe 50 running therefrom to a connection with the pull-back cylinder pipe line 41. The surge valve 49 serves to permit the prefilling of the main cylinder bore 26 while the main plunger 27 is moving downward under the influence of gravity at the beginning of the forward stroke, and also serves to release fluid from the main cylinder bore 26 during the return stroke of the platen. The fluid for this purpose is taken in from the surge tank 45 and returned thereto. The details of the surge valve 49 form no part of the present invention, and a complete disclosure thereof will be found in United States patent to Walter Ernst, No. 1,892,568, issued December 27, 1932. A pair of check valves 51 in the pipes 43 prevent the return flow of fluid from the surge tank 45 to the pull-back cylinder bores 37.

Reciprocably mounted in the frame of the press, as by the lug 52 and similar lugs in the lower portion of the press frame (not shown), is a press control rod 53. The latter passes through an aperture in a platen arm 54 extending outwardly from the platen 31 in such a manner as to engage an adjustable stop 55 on the control rod 53 so as to lift the latter upon its upward or return stroke. The control rod 53 may also be shifted manually by suitable hand levers in a conventional manner (not shown). Also mounted upon the control rod 53 is an adjustable collar 61 which is adapted to operate the lever of a limit switch to deenergize the solenoid 7 at a predetermined position on the return stroke of the platen 31 when the collar 55 and control rod 53 have been raised by engagement with the platen arm 54.

On the upper end of the control rod 53 is a collar 63 arranged to engage the rounded ends 64 of the yoke-shaped end of a lever 65 which is pivotally mounted upon the shaft 66. The latter is mounted upon the upper member 20 of the press. Pivotally connected to the opposite end of the lever 65 from the rounded ends 64 is a clevis 67, having a link 68 leading to a clevis 69 pivotally mounted upon the armature 70 of the solenoid 7. The latter is provided with an operating coil 71, the energization of which is controlled in the manner described below.

Operatively connected to the lever 65 and mounted to move upon the same shaft 66 is an arm 73. To the outer end of this arm 73 is pivotally attached a clevis 74 secured to a connecting rod 75, terminating in a clevis 76 which pivotally engages the upper end of a lever 77. The latter is pivotally supported on the shaft 78 and on its lower end is pivotally connected to a clevis 79, mounted on the end of the operating rod 80 of the control valve 2. The details of the control valve 2 are described below. Consequently, it will be seen that when the solenoid winding 71 is energized the armature 70 will be drawn downward, moving the operating rod 80 to the left. When the solenoid 71 is deenergized, however, a spring 97 is provided for forcing this linkage in the opposite direction and moving the solenoid armature 70 upward, the valve operating rod 80 being consequently moved to the right.

On the upper side of the control valve 2 is a connection 94 to which is attached the pressure line 81 leading to the pressure coupling 82 of the pump 3. The suction coupling 83 of the pump 3 is connected to the pipe line 84 running to the surge tank 45 at the port 85. Leading from the connection 95 on the lower side of the control valve 2 is a pipe line 86, connected at its opposite end to the pull-back line 41. Leading from the adjacent bottom connection 96 of the control valve 2 is a pipe line 87, terminating in the port 88 in the main cylinder bore 26. A connection 89 leads by way of the pipe line 90 to the surge tank 45 by way of the port 91 therein. Manually operated valves 92 and 93 serve to shut off the surge tank 45 from the pump 3 and valve 2 in the event that it is desired to disconnect either of these elements from the press. The pump 3 is of the variable delivery type and is driven by any suitable means, such as by an electric motor, (not shown). The details of the pump and its control elements form no part of the present invention. The control of the pump is varied by means of the hand wheel 113, which engages a slidable sleeve 114 which moves into a casing 120 containing a coil spring (not shown). The coil spring resists the motion of the motive piston within the casing 127 of the servomotor 4, the details of which likewise form no part of the present invention. A disclosure of the details of the pump 3 with its servomotor 4 and its adjusting mechanism 5, together with the switch 6 operated by the servomotor 4, will be found in the copending application of Walter Ernst, Ser. No. 93,465, filed July 30, 1936.

*Valve construction and operation*

Figure 2:
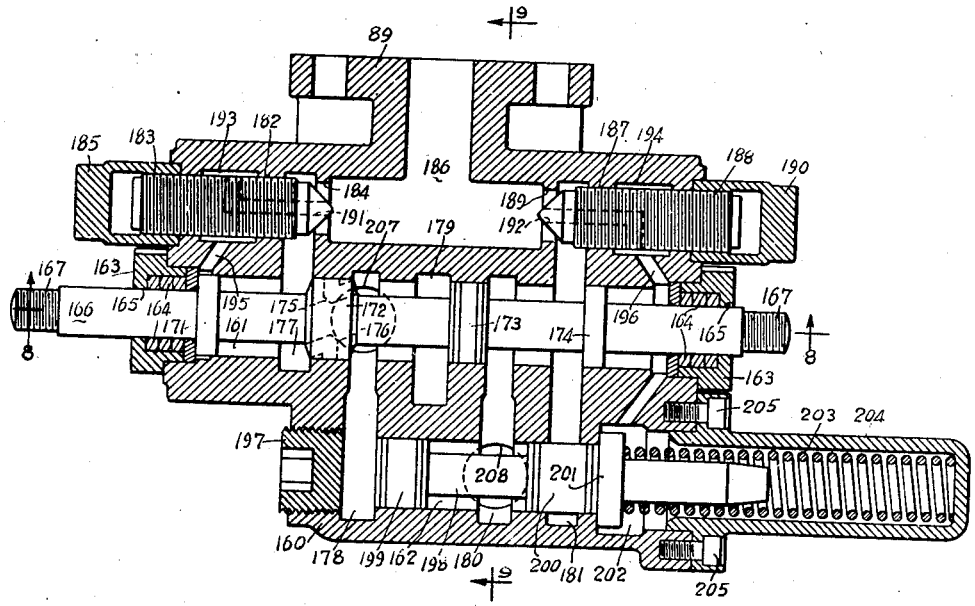
Figure 2 is a horizontal section through the control valve of this invention, taken along the line 2—2 in Figure 1, and showing the valve in its first position for causing a forward movement of the press.

The control valve 2 consists of a casing 160 (Figures 2 to 13), provided with a pair of substantially parallel bores 161 and 162 (Figure 2). The opposite ends of the bore 161 are closed by the annular plugs 163, having the packings 164 for preventing the escape of fluid. The screws 158 serve to secure the plugs 163 to the casing 160 (Figure 7). Passing through the apertures 165 in the annular plugs 163 is a reversing valve rod 166, having threaded ends 167. Mounted on one of these threaded ends 167 is a clevis 168, which pivotally engages, as at 169, a clevis 170 mounted on the end of the valve operating rod 80 (Figures 1 and 2).

The valve rod 166 is provided with a plurality of heads 171, 172, 173 and 174. The heads 171 and 174 serve to limit the reciprocation of the valve rod 166 by engaging the annular plugs 163 at the opposite limit of reciprocation. The valve head 172 is provided with oppositely drilled passages 175 and 176, which serve for the passage of fluid in the mid-position of the valve shown in Figure 6, at which time the valve is in the position for causing the platen to remain idle at the top of its stroke.

The valve bore 161 is provided with a plurality of enlarged ducts 177, 178, 179, 180 and 181. The duct 177 leads from the bore 161 to the choke bore 182, the latter receiving the choke screw 183, threaded therein and arranged to partially close the aperture 184 in the end thereof. The end cap 185 covers the end of the choke screw 183 and prevents it from being accidentally rotated. The aperture 184 opens into the exhaust duct 186, passing through the connection 89 by which the valve is supported upon the press head 11.

The duct 181 also establishes communication between the valve bore 161 and the choke bore 187. The latter is of similar construction to the choke bore 182 and receives a choke screw 188, threaded therein and having a tapered end, partially closing the aperture 189, likewise leading into the exhaust duct 186. The choke screw 188 is similarly covered by an end cap 190 for a similar purpose to the end cap 185. The choke screws 183 and 188 are provided with drilled passages 191 and 192, respectively, these providing drainage into the exhaust duct 186 from the annular chambers 193 and 194 surrounding the choke screws 183 and 188, and communicating by the drilled passages 195 and 196 with the opposite ends of the valve bore 161. The outer end of the duct 181 communicates with the valve bore 162. The ducts 178 and 180 also establish intercommunication between the valve bores 161 and 162. The outer end of the valve bore 162 is closed by a threaded plug 197, giving access to the interior thereof.

Reciprocably mounted in the valve bore 162 is a by-pass valve rod 198, having spaced heads 199 and 200 thereon. An enlargement 201 in the chamber 202 serves to limit the motion of the valve rod 198, and is urged to the left by the coil spring 203, whose opposite end rests against the inner wall of the spring cap 204. The latter is secured to the casing 160 by means of the screws 205. Fluid is permitted to enter the duct 179 in the valve bore 161 through the port 206 (Figure 8). The latter communicates with the upper connection 94, leading to the pressure pipe line 81 from the pump 3. The port 207 leads from the duct 178 to the lower left-hand connection 96, whence the pipe line 87 leads to the main cylinder 26. A third port 208 leads from the duct 180, within the valve bore 162, to the outer connection 95, from which the pipe line 86 runs to the pipe line 41 of the pull-back cylinders 39 (Figures 1 and 2).

In the operation of the control valve 2 the valve rods 166 and 198 may occupy any one of the five different positions shown in Figures 2 to 6, inclusive. The first position of the control valve 2 provides for the forward movement of the press, and is shown in Figure 2. In this position the fluid from the pressure coupling 82 of the pump 3 passes along the pressure line 81, through the connection 94 and port 206, into the duct 179, thence through the passageway provided between the valve heads 173 and 172, into the duct 178, thence through the port 207 and the connection 96, to and through the line 87 leading to the main cylinder 26 (Figures 1 and 2).

At the same time the oil from the pull-back cylinders 39 proceeds through the pipe lines 41 and 86 to the connection 95, thence through the port 208 into the duct 180, thence through the passageway between the valve heads 173 and 174, into the duct 181, thence through the choked aperture 189, into the exhaust duct 186, thence through the pipe line 90, into the surge tank 45, through the port 91 thereof (Figures 1 and 2). The choke screw 188 permits the rapid traverse speed of the platen to be adjusted by varying the size of the annular passage through the aperture 189 into the exhaust duct 186.

Figure 3:
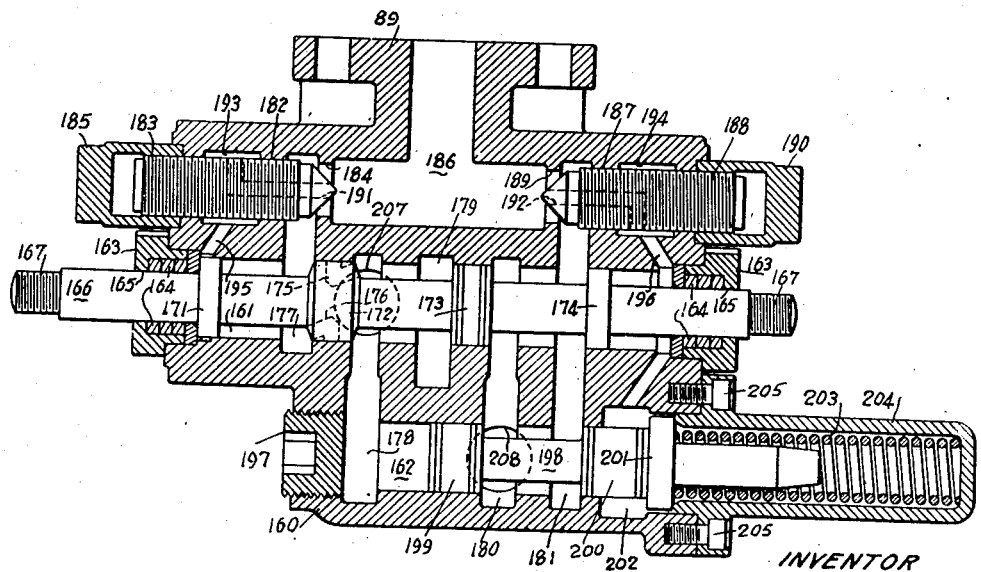
Figure 3 is a view similar to Figure 2, but with the valve in its second position, i. e. during the pressing operation.

As soon as the press platen encounters the resistance of the workpiece, the pressure built up in the system will force the lower valve head 199 to the right into the position shown in Figure 3. This position is maintained during the pressing operation, and the fluid coming from the pull-back cylinders 39, through the port 208, is additionally permitted to pass outward through the duct 181, as well as through the duct 180.

Figure 4:
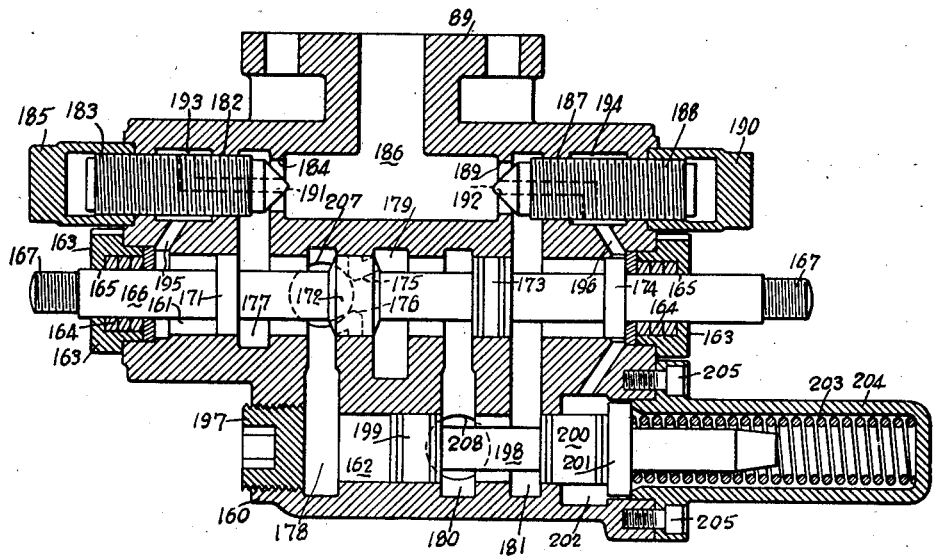
Figure 4 is a view similar to Figure 2, but with the valve in its third position, i. e. during the interval between the forward and return strokes of the press and while the pump discharge is being by-passed during the release of pressure from the main cylinder.

When the desired pressure has been exerted upon the workpiece, the valve rod 166 is moved to the right into the position shown in Figure 4, either manually, by means of the hand lever or by the solenoid 71, as energized by the opening of the normally closed switch 6 associated with the pump 3. In this position the pump discharge proceeds through the port 206 and into the duct 179, and thence through the annular passageway between the heads 172 and 173, into the duct 180, thence through the annular passageway between the heads 199 and 200 on the valve rod 198, into the duct 181, and thence outward through the choked aperture 189, into the exhaust duct 186, returning to the surge tank 45 by the line 90.

In this manner the discharge of the pump is diverted to the surge tank 45, and thus by-passed while the pressure is discharging from the main cylinder 26. The fluid from the main cylinder 26 proceeds through the port 88 and the line 87, through the connection 96 and the port 207, into the duct 178, and thence through the annular passageway between the heads 172 and 171, into the duct 177, thence outward past the chocked aperture 184, into the exhaust duct 186, and thence to the surge tank 45 by way of the line 90.

Thus the choke screw 183 may be adjusted so that a gradual and slow release of the pressure fluid from the main cylinder can take place, without any shock because the pump discharge is by-passed while this release is taking place. This provision gives a place for the flow of the pump to be diverted while the gradual release of the pressure in the main cylinder takes place, for otherwise pressure from the pump could not lift the platen 31 by means of the pull-back pistons 38 so long as there was pressure in the main cylinder 26. The piston valve arrangement on the valve rod 198, therefore, permits the pump to by-pass freely while the slow release of the pressure fluid in the main cylinder takes place, thereby avoiding the shock and "water hammer" occasioned by sudden releases of pressure.

Figure 5:
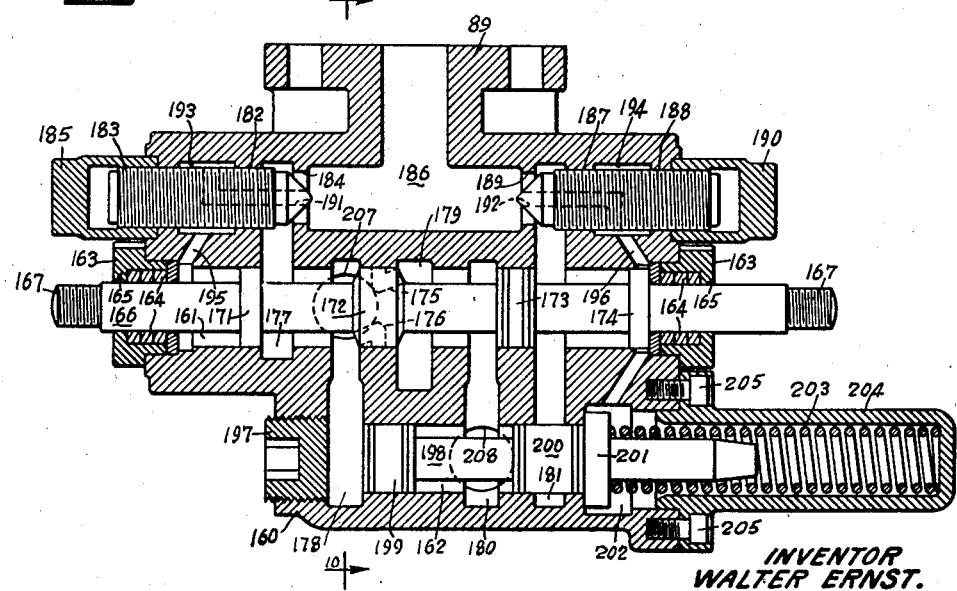
Figure 5 is a view similar to Figure 2, but with the valve in its fourth position, i. e. during the return stroke of the press.

While the pressure in the main cylinder is being released in this manner, the consequent drop in pressure permits the urge of the spring 203 to overcome the pressure remaining in the duct 178 and shifts the valve rod 198 and its valve heads 199 and 200 to the fourth position of the valve, as shown in Figure 5, thus shutting off the by-passing arrangement of the pump. The pump now discharges from the port 206 of the valve 2, into the duct 179, through the annular passageway between the valve heads 172 and 173, and through the duct 180, into the port 208, thence through the connection 95 and pipe lines 86 and 41 to the pull-back cylinders 39. The pump now discharges into the pull-back cylinders 39 and starts the return stroke of the press.

When the press platen reaches the end of its return stroke the platen arm 54 (Figure 1) raises the collar 55 on the control rod 53, pushes the control rod 53 upward and actuates the linkages connected therewith to shift the valve rod 166 to its fifth position, shown in Figure 6. The valve heads 171, 172, 173 and 174 on the valve rod 166 now occupy an intermediate position to those shown in Figures 2 and 4, respectively. In this position the fluid from the pump entering the control valve 2 through the port 206 passes through the annular passageway to the right of the valve head 172, thence through the drilled passageways 175 in the valve head 172, thence into the duct 178, thence through the drilled passageways 176 in the valve head 172, and through the annular passageway to the left of the valve head 172, into the duct 177, thence outward through the choked passageway 184, into the discharge duct 186 and back to the surge tank 45 by way of the pipe line 90.

The fluid in the pull-back cylinders 39 is imprisoned in this position by the valve head 173 covering the entrance to the duct 180. The platen accordingly halts and remains in a fixed position while the control valve 2 is in its fifth position (Figure 6). Should there be any tendency for the platen to coast downward the valve rod 166 will shift to the right, thus opening up a connection between the port 206 from the pump 3 and the duct 180 leading to the port 208, so that pressure fluid flows along the line 86 and the pull-back cylinders, returning the platen to its previous position. By the same action the by-pass connection through the drilled passages 175 and 176 in the valve head 172 is closed. Consequently, the press platen is automatically returned to its top position whenever any tendency to trip downward is started.

The electrical system interconnecting the switch 6 with the solenoid 7 forms no part of the present invention, and a complete disclosure thereof will be found in the copending application of Walter Ernst, Ser. No. 34,652, filed August 5, 1935, now Patent No. 2,190,939.

It will be understood that I desire to comprehend within my invention such modifications as come within the scope of the claims and the invention.

Having thus fully described my invention, what I claim as new and desire to secure by Letters Patent, is:

1. In a valve for regulating a hydraulic circuit including a main cylinder, a casing having fluid intake and exhaust ports and two machine-operating ports, and a pair of bores with interconnecting passageways; a reversing valve member in one bore movable into a plurality of positions relatively to said ports including a machine-reversing position for directing fluid from said intake port to one of said operating ports while directing fluid from the other operating port to said exhaust port, and a by-pass valve member in the other bore rendered operative in response to the setting of said reversing valve member in said machine-reversing position and movable in response to the attainment of a predetermined main cylinder pressure for by-passing the fluid from said intake port to said exhaust port during the duration of said predetermined pressure.

2. In a valve for regulating a hydraulic circuit including a main cylinder, a casing having fluid intake and exhaust ports and two machine-operating ports, and a pair of bores with interconnecting passageways; a reversing valve member in one bore movable into a plurality of positions relatively to said ports including a machine-reversing position for directing fluid from said intake port to one of said operating ports while directing fluid from the other operating port to said exhaust port, a by-pass valve member in the other bore rendered operative in response to the setting of said reversing valve member in said machine-reversing position and movable in response to the attainment of a predetermined main cylinder pressure for by-passing the fluid from said intake port to said exhaust port during the duration of said pre-determined pressure, and fluid flow-restricting means disposed between said by-pass valve member and said exhaust port.

3. In a valve for regulating a hydraulic circuit including a main cylinder, a casing having fluid intake and exhaust ports and two machine-operating ports, and a pair of bores with interconnecting passageways; a reversing valve member in one bore movable into a plurality of positions relatively to said ports including a machine-reversing position for directing fluid from said intake port to one of said operating ports while directing fluid from the other operating port to said exhaust port, a by-pass valve member in the other bore rendered operative in response to the setting of said reversing valve member in said machine-reversing position and movable in response to the attainment of a predetermined main cylinder pressure for by-passing the fluid from said intake port to said exhaust port during the duration of said predetermined pressure, fluid flow-restricting means disposed between said by-pass valve member and said exhaust port, and means for adjustably varying the flow-restricting action of said flow-restricting means.

4. In a valve for regulating a hydraulic circuit including a main cylinder, a casing having fluid intake and exhaust ports and two machine-operating ports, and a pair of bores with interconnecting passageways; a reversing valve member in one bore movable into a plurality of positions relatively to said ports including a machine-reversing position for directing fluid from said intake port to one of said operating ports while directing fluid from the other operating port to said exhaust port, and a by-pass valve member in the other bore rendered operative in response to the setting of said reversing valve member in said machine-reversing position and movable in response to the attainment of a predetermined main cylinder pressure for by-passing the fluid from said intake port to said exhaust port during the duration of said predetermined pressure, said reversing valve member having spaced heads, one of said heads having fluid-conducting means therein for directing fluid from said intake port to said exhaust port in another position of said reversing valve member.

5. In a valve for regulating a hydraulic circuit including a main cylinder, a casing having fluid intake and exhaust ports and two machine-operating ports, and a pair of bores with interconnecting passageways; a reversing valve member in one bore movable into a plurality of positions relatively to said ports including a machine-reversing position for directing fluid from said intake port to one of said operating ports while directing fluid from the other operating port to said exhaust port, and a by-pass valve member in the other bore rendered operative in response to the setting of said reversing valve member in said machine-reversing position and movable in response to the attainment of a predetermined main cylinder pressure for by-passing the fluid from said intake port to said exhaust port during the duration of said predetermined pressure, said reversing valve member having spaced heads movable into an additional neutral position, one of said heads having fluid conduits therethrough and operative to direct fluid from said intake port to said exhaust port while said heads occupy said neutral position.

6. In a valve for regulating a hydraulic circuit including a main cylinder, a casing having fluid intake and exhaust ports and two machine-operating ports, and a pair of bores with interconnecting passageways; a reversing valve member in one bore movable into a plurality of positions relatively to said ports including a machine-reversing position for directing fluid from said intake port to one of said operating ports while directing fluid from the other operating port to said exhaust port, a by-pass valve member in the other bore rendered operative in response to the setting of said reversing valve member in said machine-reversing position and movable in response to the attainment of a predetermined main cylinder pressure for by-passing the fluid from said intake port to said exhaust port during the duration of said predetermined pressure, and fluid flow-restricting means disposed between said by-pass valve member and said exhaust port, said reversing valve member having spaced heads movable into an additional neutral position, one of said heads having fluid conduits therethrough and operative to direct fluid from said intake port to said exhaust port while said heads occupy said neutral position.

7. In a valve for regulating a hydraulic circuit including a main cylinder, a casing having fluid intake and exhaust ports and two machine-operating ports, and a pair of bores with interconnecting passageways; a reversing valve member in one bore having spaced heads movable into a plurality of positions relatively to said ports including a machine-reversing position for directing fluid from said intake port to one of said operating ports while directing fluid from the other operating port to said exhaust port, and a by-pass valve member in the other bore having spaced heads rendered operative in response to the setting of said reversing valve member in said machine-reversing position and movable in response to the attainment of a predetermined main cylinder pressure for by-passing the fluid from said intake port to said exhaust port during the duration of said predetermined pressure.

8. In a valve for regulating a hydraulic circuit including a main cylinder, a casing having fluid intake and exhaust ports and two machine-operating ports, and a pair of bores with interconnecting passageways; a reversing valve member in one bore having spaced heads movable into a plurality of positions relatively to said ports including a machine-reversing position for directing fluid from said intake port to one of said operating ports while directing fluid from the other operating port to said exhaust port, a by-pass valve member in the other bore having spaced heads rendered operative in response to the setting of said reversing valve member in said machine-reversing position and movable in response to the attainment of a predetermined main cylinder pressure for by-passing the fluid from said intake port to said exhaust port during the duration of said predetermined pressure, and fluid flow-restricting means disposed between said by-pass valve member and said exhaust port.

WALTER ERNST.